United States Patent
Wicks et al.

[11] Patent Number: 5,990,805
[45] Date of Patent: Nov. 23, 1999

[54] ASTRONOMICAL AND METEOROLIGICAL INFORMATION PAGER

[75] Inventors: James E. Wicks, San Francisco, Calif.; Eduardo Sciammarella, Hoboken, N.J.

[73] Assignees: Sony Corporation, Tokyo, Japan; Sony Electronics, Inc., Park Ridge, N.J.

[21] Appl. No.: 08/799,263

[22] Filed: Feb. 13, 1997

[51] Int. Cl.[6] .................................................. G08B 5/22
[52] U.S. Cl. ................................. 340/825.44; 455/186.1
[58] Field of Search ......................... 340/825.44, 825.56, 340/825.47, 825.48, 825.49; 455/38.1, 38.4, 88, 186.1, 89, 90

[56] References Cited

U.S. PATENT DOCUMENTS

| | | | |
|---|---|---|---|
| 4,415,065 | 11/1983 | Sandstedt | 186/39 |
| 4,951,039 | 8/1990 | Schwendeman et al. | 340/725 |
| 5,173,688 | 12/1992 | DeLuca et al. | 340/825.44 |
| 5,182,553 | 1/1993 | Kung | 340/825.44 |
| 5,331,431 | 7/1994 | Jasinski | 358/462 |
| 5,398,021 | 3/1995 | Moore | 340/825.44 |
| 5,446,678 | 8/1995 | Saltzstein et al. | 340/825.44 |
| 5,452,356 | 9/1995 | Albert | 340/825.44 |
| 5,481,255 | 1/1996 | Albert et al. | 340/825.55 |
| 5,491,785 | 2/1996 | Robson et al. | 395/162 |
| 5,495,344 | 2/1996 | Callaway, Jr. et al. | 358/407 |
| 5,508,695 | 4/1996 | Nelson et al. | 340/825.44 |
| 5,535,428 | 7/1996 | King et al. | 455/38.4 |
| 5,555,446 | 9/1996 | Jasinski | 340/825.44 |
| 5,625,363 | 4/1997 | Spilker | 342/352 |
| 5,774,787 | 6/1998 | Leopold et al. | 455/12.1 |

*Primary Examiner*—Michael Horabik
*Assistant Examiner*—Joan B. Jeanglaude
*Attorney, Agent, or Firm*—Ronald P. Kananen; Rader, Fishman & Grauer

[57] ABSTRACT

A novel pager and paging system provides subscribers with astronomical and meteorological information. A service provider compiles a database of astronomical and meteorological information such as: current and forecast weather conditions; where and when celestial phenomena can be observed; horoscope information; and constellation configurations. Subscribers provide the service provider with a profile detailing what information the subscriber wishes to receive. The service provider will collect information, match the information to the subscriber's profile, and transmit the matching information to the subscriber.

9 Claims, 4 Drawing Sheets

ASTRONOMICAL AND METEOROLIGICAL INFORMATION PAGER

FIELD OF THE INVENTION

The present invention relates generally to the field of wireless pagers. More particularly, the present invention relates to the application of wireless pager technology to the distribution of astronomical and meteorological information.

BACKGROUND OF THE INVENTION

Portable radio receivers and transceivers, such as wireless pagers, have become increasingly popular as a means of communication. Pagers are typically carried by users who wish or need to receive communications when they are away from a telephone or computer, or are unable to predict where they may be reached at a given time.

In general, the user of a pager purchases the unit and enters into a contract with a service provider. As shown in FIG. 1, when someone 12 wishes to page a particular user, they contact the user's service provider 11, identify the user to be paged (perhaps with a personal identification number), and may give a message to the service provider 11 that is to be broadcast to the user's pager 15.

The service provider 11 maintains a network of radio transceiver base stations 13, 14 which are spread throughout the service area covered by the service provider. The transmitting base stations 13 are distributed so that transmissions from at least one base station can be received by a pager 15 anywhere in the service area.

In a simplistic system, when the service provider 11 receives a request to page a user 15, the page is broadcast by all the base stations 13 in the system. Thus, if the pager 15 is located anywhere in the service area, it will receive the page. The pager 15 will then alert the user that a page has been received with, for example, an audible or vibratory alert signal.

In a more sophisticated system, the pager 15 may have the capability to not only receive a transmission from the service provider's system, but may have the capability to transmit an answer back to the system. This is referred to as two-way paging.

With these advances, the usefulness of pagers as a means of communication has expanded rapidly. Service providers have encouraged this expansion by experimenting with pagers as a means to disseminate information of interest to pager users. For example, as described in U.S. Pat. No. 5,508,695 to Nelson et al., incorporated herein by reference, a one-way pager system is used to relay sports or financial information to a pager user who has contracted with the service provider for that service.

However, there are many potential, undiscovered applications of pager technology which may provide pager users with, as yet unheard of, abilities to communicate. This is particularly true of the developing two-way pager systems. Accordingly, there is a need for improved methods and applications of pager technology to meet the information and communication demands of pager users.

Amateur astronomy and sky-watching have also become popular hobbies in modern society. This is in part true because our technological capabilities to explore outer space continue to develop, thus sparking our imagination. Accordingly, science fiction movies and television programs envisioning future space exploration or contact with other intelligent life have also grown in popularity as the possibilities of space travel become more real with the advance of technology.

Interest in the position and movements of the stars and planets is also of interest to many people who follow their horoscopes or practice astrology. Consequently, there is a growing number of people, ranging from novices to educated sky-watchers, who have an interest in the heavens and the movement of the stars and planets.

Thus, there is a need for a means to disseminate information about celestial phenomena to those interested. There is a further need for a means to educate those interested in studying the sky. There is also a need to convey this information and educational material at a time and in a manner which is most useful to the recipient. There is also a need to convey meteorological information when needed by recipients.

SUMMARY OF THE INVENTION

It is an object of the present invention to meet the above identified needs and others. Particularly, it is an object of the present invention to provide a pager technology in which a pager user can use a pager to receive or request astronomical and meteorological information from a paging system.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve the stated and other objects of the present invention, as embodied and described below, the invention may encompass a paging system for disseminating astronomical and meteorological information which includes: a database of astronomical and meteorological information; a processor for accessing the database; and at least one base station for transmitting the information to a pager.

The paging system of the present invention may also include a database of profiles of subscribers to the paging system who wish to receive at least some of the information. The profiles provide parameters defining what of the information available individual subscribers wish to receive, and the processor selects information to be transmitted in response to those parameters.

The paging system of the present invention may also include at least one base station for receiving a transmission from a pager, wherein the processor accesses the database and information is transmitted in response to a transmission from the pager.

The present invention may also encompass a pager which has a display; an input device; a transmitter; and a signal generator for generating a signal, which signal is a request for astronomical or meteorological information. The signal is generated by the signal generator in response to user input from the input device and is transmitted to a paging system with the transmitter.

The pager of the present invention may further include an icon on the display which can be selected using the input device. The information request signal is generated by the signal generator in response to the selection of the icon. The display may also display a configuration of points depicting the relative positions of stars in a constellation. Further, the display may display line segments connecting the points to illustrate the constellation.

The present invention also encompasses a method of using a paging system for disseminating astronomical and meteorological information, including the steps of: compiling a database of astronomical and meteorological information; accessing the database with a processor; and transmitting the information to a pager with at least one base station. The method may also include the step of updating the information in the database.

The method of the present invention may also comprise the steps of: compiling a database of profiles of subscribers to the paging system who wish to receive at least some of the information, wherein the profiles provide parameters for what of the available information individual subscribers wish to receive; and selecting information to be transmitted from among the available information in response to those parameters.

The method may further comprise the step of receiving a transmission from a pager with at least one base station. The steps of accessing the database and transmitting the information are performed in response to the received transmission from the pager.

The present invention also encompasses a method of using a pager, comprising the steps of: providing a display; inputting data to the pager with an input device; generating a signal which is a request for astronomical or meteorological information in response to user input from the step of inputting; and transmitting the signal.

This method may further include the steps of: displaying an icon with the display; selecting the icon using the input device; and generating the signal in response to the selection of the icon.

Finally, this method of the present invention may further include the step of displaying with the display a configuration of points depicting the relative positions of stars in a constellation, and the step of displaying line segments with the display. The line segments connect the points to illustrate the constellation.

BRIEF DESCRIPTION OF THE DRAWINGS

The accompanying drawings illustrate the present invention and are a part of the specification. Together with the following description, the drawings demonstrate and explain the principles of the present invention. In the drawings.

DETAILED DESCRIPTION OF THE PREFERRED EMBODIMENT

Using the drawings, the preferred embodiment of the present invention will now be explained.

Under the principles of the present invention, the paging system service provider 11 may offer pager users a service delivering astronomical and meteorological information. For example, the service provider may provide such astronomical and meteorological information as the current and forecasted weather conditions, the time of sunrise/sunset, and the phase of the moon. The astronomical information provided may also be when and where in the sky celestial phenomena may be observed. Such phenomena may include, for example, particular stars, planets or constellations; lunar eclipses; comets; meteor showers; etc. The information provided by the service may also include horoscopes and planetary alignment information or information about upcoming science fiction events.

If the pager user desires the service, he or she may contract with the service provider. The service provider 11 may then have the subscribing pager user provide an interest profile that details what types of information available through the service the pager user wishes to receive.

Figure 4:
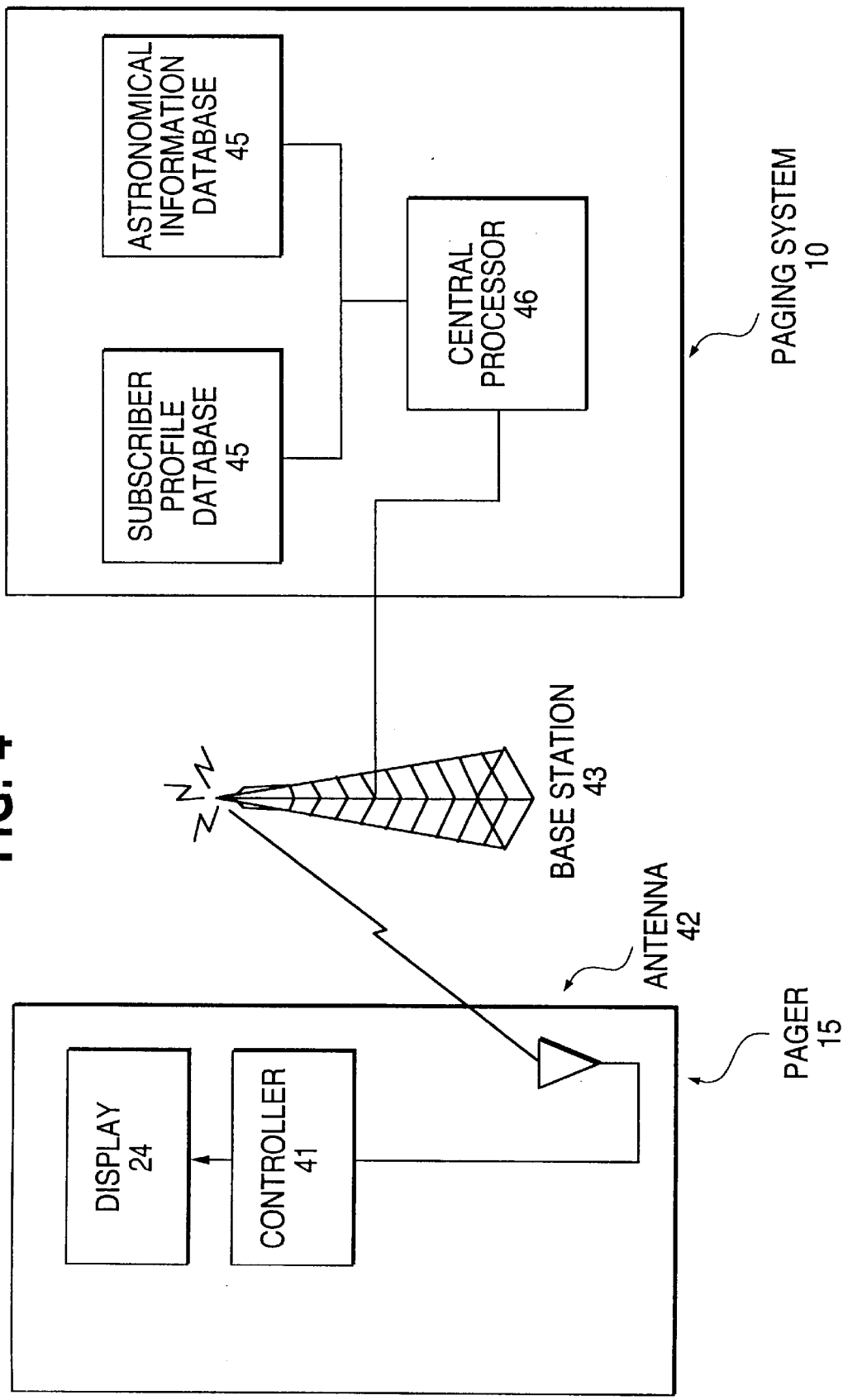
FIG. 4 is a diagram of the major components of a system according to the present invention.

As shown in FIG. 4, the service provider will maintain a paging system 10 which includes a database 44 containing the interest profiles of those pager users subscribing to the astronomical information service. The paging system 10 will also include a database 45 of astronomical and meteorological information. Information for this database 45 will be compiled and updated regularly by the service provider. Databases 44 and 45 are tied to a central processor 46 of paging system 10.

As described above, a pager and paging system may allow for one-way or two-way paging. The principles and features of the present invention may be practiced with either type of paging system.

In a one-way paging system, the central processor 46 will periodically or at appropriate times retrieve from the profile database 44 the parameters defining the astronomical and meteorological information each particular subscriber wishes to receive. The processor 46 will then search the information database 45 for current information which matches the interest profile of each subscriber.

When such information is compiled, processor 46 using base station 43 transmits astronomical or meteorological information to each individual subscriber of the service according to that subscriber's interests. The subscriber's pager 15 will have an antenna 42 with which to receive the information transmitted by the paging system 10. A controller 41 receives the transmitted information via antenna 42 and displays the information for the subscriber on display 24.

In a two-way paging system, the subscriber has more control over when astronomical or meteorological information is sent by the paging system 10. For example, the service provider on a two-way paging system can refrain from transmitting astronomical and meteorological information matching a subscriber's profile until that subscriber signals the paging system 10 to transmit such information.

Figure 1:
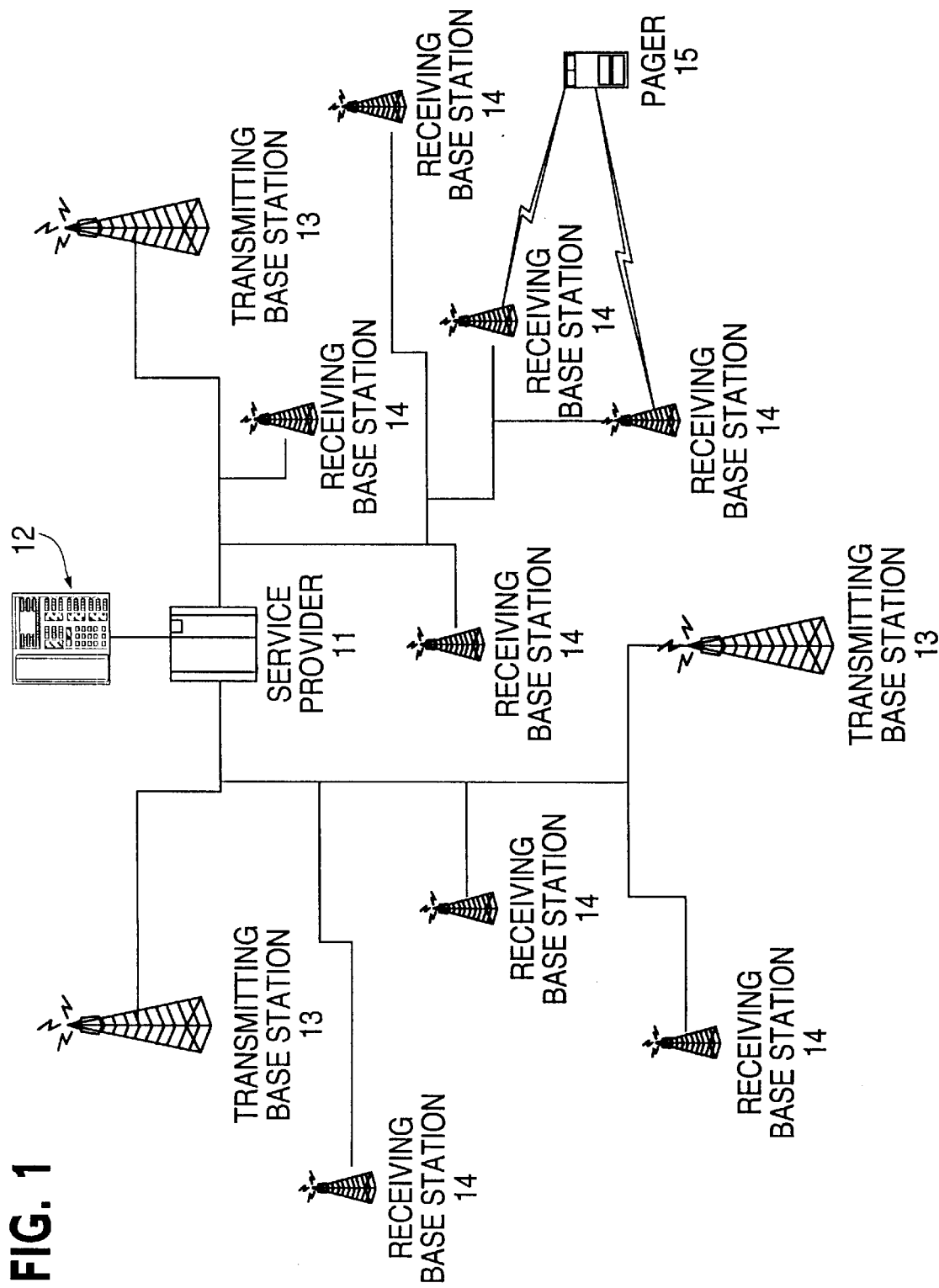
FIG. 1 is a schematic diagram of a conventional two-way paging network with which the present invention may be practiced.
Figure 2:
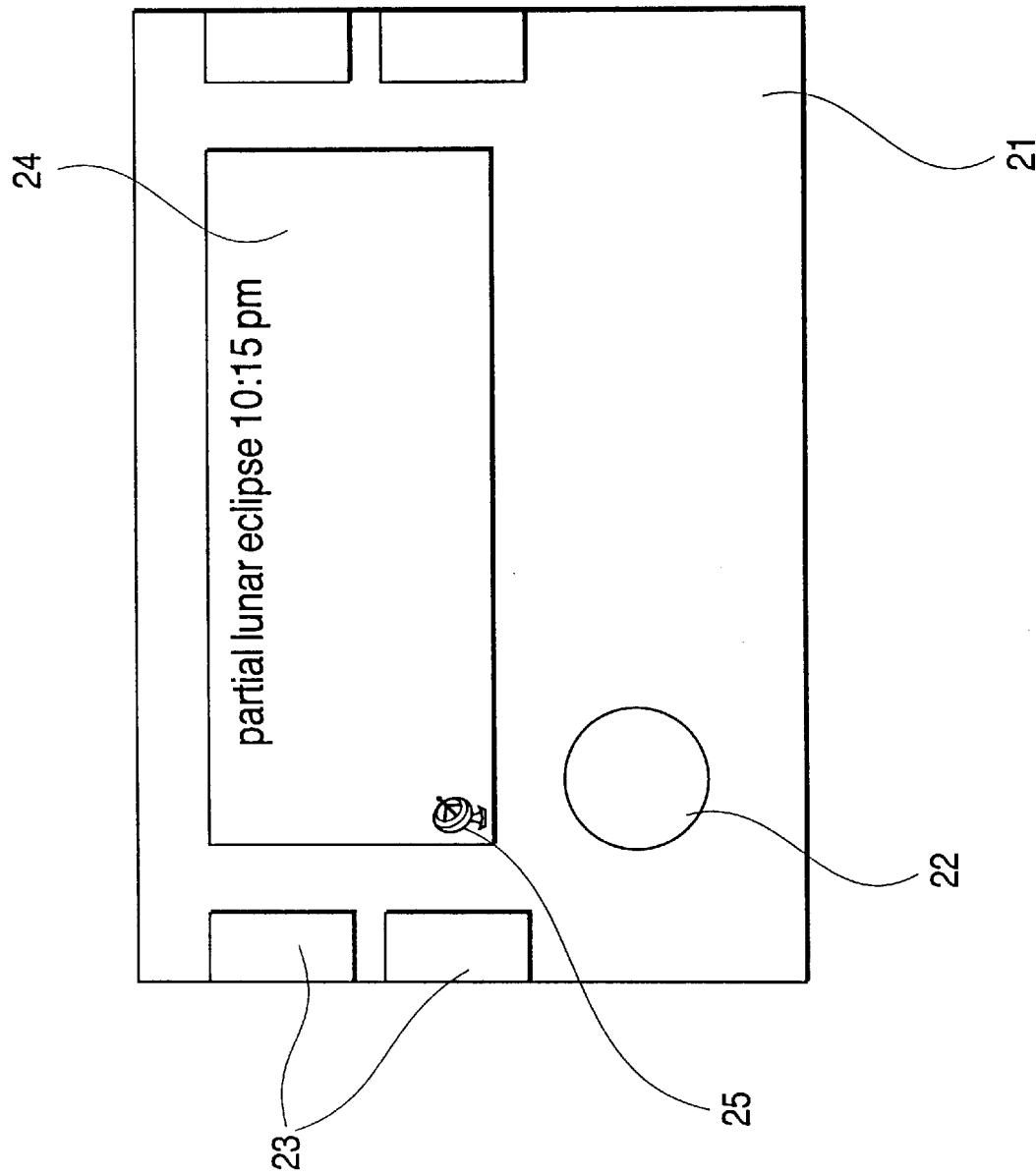
FIG. 2 is a diagram of a pager according to the principles of the present invention.

In such a system, the pager of the present invention may have a dedicated button which, when pressed, signals the service provider 34 to transmit information matching the subscriber's profile. However, in the preferred embodiment, illustrated in FIG. 2, the subscriber's pager 21 includes a liquid crystal display 24. On the display 24, the subscriber will find an icon 25 which, when selected, sends the request to the service provider to transmit astronomical or meteorological information to the subscriber.

To select the icon 25, the pager is provided with buttons 23 for moving a cursor (not shown) on display 24. When the cursor is highlighting the icon 25, the subscriber presses the select button 22. The subscriber's pager may be programmed with this feature by the service provider when the contract between the service provider and the pager subscriber is set up and the pager subscriber indicates a desire for the astronomical and meteorological information service.

Figure 3:
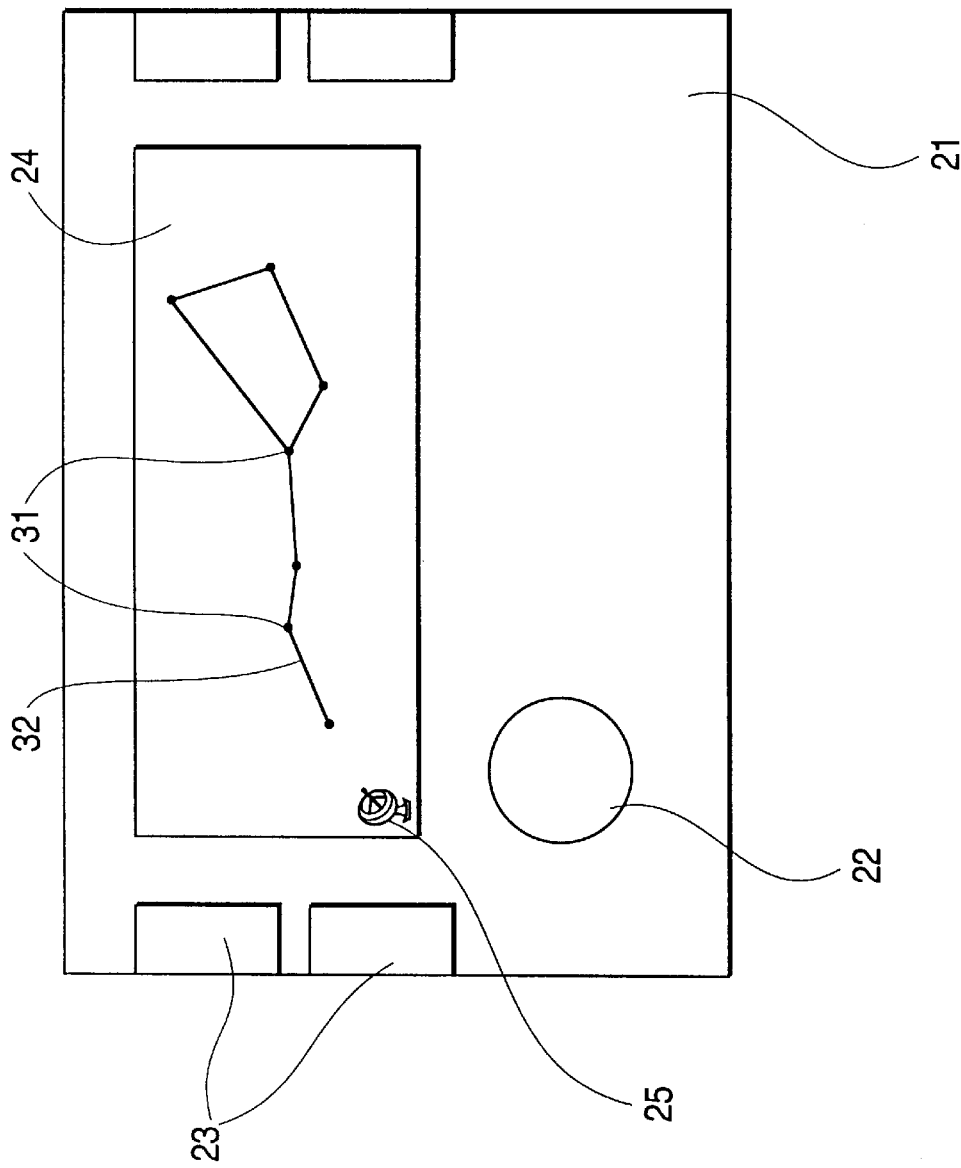
FIG. 3 is a also diagram of a pager according to the principles of the present invention.

As shown in FIG. 3, the pager 21 of the present invention may also have a display 24 and programming that enable it to illustrate basic constellation shapes. Such a display and programming are within the purview of one skilled in the art and are therefore not described in more detail here.

In the example of FIG. 3, the outline of the Big Dipper is provided on display 24. The representation of the constellation may include only dots 31 indicating the relative placement of stars. Alternatively, the dots 31 may be connected by line segments 32 to provide the subscriber a better idea of what the constellation is supposed to represent.

When a particular constellation is visible in the night sky, the service provider may transmit the constellation outline at an appropriate time or at the demand of the subscriber to the subscriber's pager. This allows subscribers to educate themselves by helping them find and identify constellations.

In a one-way paging system, the service may also take into account the current weather conditions. For example, if the sky is overcast and no astronomical phenomena are observable, the service provider may suspend transmissions of astronomical information to service subscribers. Alternatively, subscribers may specify in their profiles whether they wish to continue receiving information even during inclement weather.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A paging system for disseminating astronomical or meteorological information, comprising:

a database of astronomical information;

a processor for accessing said database;

at least one base station for transmitting said information to a pager; and at least one base station for receiving a transmission from a pager, wherein said processor accesses said database and information is transmitted in response to a transmission from said pager;

wherein said processor suspends transmission of said information when said processor receives a signal indicating that skies are overcast so as to substantially degrade visibility of celestial phenomena.

2. A paging system for disseminating astronomical or meteorological information, comprising:

a database of astronomical or meteorological information;

a processor for accessing said database;

at least one base station for transmitting said information to a pager;

a database of profiles of subscribers to the paging system who have subscribed to receive at least some of said information, wherein:

said profiles provide parameters defining what of said information individual subscribers have asked to receive; and said processor selects information to be transmitted from among said information in response to said parameters; and at least one base station for receiving a transmission from a pager, wherein said processor accesses said database and information is transmitted in response to a transmission from said pager;

wherein said system suspends transmission of said information when skies are overcast so as to substantially degrade visibility of celestial phenomena.

3. A pager for receiving a transmission of astronomical information regarding a constellation and for displaying said information to a user, said pager comprising:

a receiver for receiving said transmission of information; and a display, wherein said display displays a configuration of points depicting the relative positions of stars in a constellation.

4. The pager of claim 3, further comprising:

an input device;

a transmitter; and a signal generator for generating a signal which signal is a request for astronomical or meteorological information;

wherein said signal is generated by said signal generator in response to user input from said input device and is transmitted to a paging system with said transmitter;

wherein said display further comprises an icon, wherein said signal is generated by said signal generator when said icon is selected using said input device.

5. The pager of claim 3, wherein said display further displays line segments connecting said points to illustrate said constellation.

6. A method of using a pager for receiving a transmission of astronomical information regarding a constellation and for displaying said information to a user, said method comprising:

receiving said transmission of information with a receiver of said pager; and displaying with a display of said pager a configuration of points depicting the relative positions of stars in a constellation.

7. The method of using a pager of claim 6, further comprising the steps of:

displaying an icon with said display;

inputting data to said pager with an input device including selecting said icon using said input device;

generating a signal which signal is a request for astronomical or meteorological information, wherein said signal is generated in response to said selection of said icon using said user input; and transmitting said signal.

8. The method of claim 6, further comprising the step of displaying line segments with said display, which line segments connect said points to illustrate said constellation.

9. A paging system for disseminating astronomical or meteorological information, comprising:

a database of astronomical or meteorological information;

a processor for accessing said database; and at least one base station for transmitting said information to a pager;

wherein said processor suspends transmission of said information when said processor receives a signal indicating that skies are overcast so as to substantially degrade visibility of celestial phenomena.

* * * * *